(12) United States Patent
Vogl

(10) Patent No.: US 9,261,050 B2
(45) Date of Patent: Feb. 16, 2016

(54) CRANKCASE VENTILATION DEVICE FOR A MOTOR VEHICLE

(75) Inventor: Roland Vogl, Weiterstadt (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 441 days.

(21) Appl. No.: 13/364,443

(22) Filed: Feb. 2, 2012

(65) Prior Publication Data

US 2012/0199104 A1    Aug. 9, 2012

(30) Foreign Application Priority Data

Feb. 3, 2011    (DE) .................... 10 2011 010 289

(51) Int. Cl.
*F01M 13/00*    (2006.01)
*F02M 25/06*    (2006.01)
*F01M 13/04*    (2006.01)
*F02M 35/10*    (2006.01)

(52) U.S. Cl.
CPC ............... *F02M 25/06* (2013.01); *F01M 13/04* (2013.01); *F02M 35/10118* (2013.01); *F02M 35/10144* (2013.01); *F02M 35/10157* (2013.01); *F02M 35/10222* (2013.01); *Y02T 10/121* (2013.01); *Y02T 10/144* (2013.01)

(58) Field of Classification Search
CPC ............ F02M 25/06; F02M 35/10144; F02M 35/10157; F02M 35/10222; F01M 13/04; F01M 35/10118; Y02T 10/121; Y02T 10/144
USPC ....................... 123/572–574, 41.86
See application file for complete search history.

(56) References Cited

U.S. PATENT DOCUMENTS

| 5,884,612 A | 3/1999 | Takeyama et al. |
| 6,606,982 B1 * | 8/2003 | Stockhausen et al. ........ 123/572 |
| 7,886,727 B2 * | 2/2011 | Ulrey et al. .............. 123/568.15 |
| 2008/0314351 A1 | 12/2008 | Ryrholm et al. |

FOREIGN PATENT DOCUMENTS

| DE | 1831027 U | 5/1961 |
| DE | 3940392 A1 | 6/1991 |
| DE | 10237762 A1 | 2/2004 |
| DE | 102004043545 A1 | 3/2006 |
| DE | 202005012793 U1 | 12/2006 |
| DE | 202005020261 U1 | 5/2007 |
| DE | 102008027577 A1 | 1/2009 |
| JP | 8144732 A | 6/1996 |
| JP | 8246837 A | 9/1996 |

* cited by examiner

*Primary Examiner* — Marguerite McMahon
(74) *Attorney, Agent, or Firm* — Ingrassia Fisher & Lorenz PC

(57) ABSTRACT

A crankcase ventilation device is provided for an internal combustion engine. The crankcase ventilation device includes, but is not limited to an intake air inlet configured to have intake air flowing therethrough, and a crankcase gas inlet configured to have crankcase gas flowing therethrough, and a charge air outlet configured to have charge air flowing therethrough. The crankcase ventilation device is configured to mix inlet crankcase gas with inlet intake air and let it out as charge air, where the intake air inlet, the crankcase gas inlet, and the charge air outlet open into a widening. The crankcase gas inlet opens into the widening at a crankcase gas inlet opening. The distance of the crankcase gas inlet opening from a flow central axis flowing at least through the intake air inlet in one plane is greater than the distance of the intake manifold wall from the flow central axis.

13 Claims, 5 Drawing Sheets

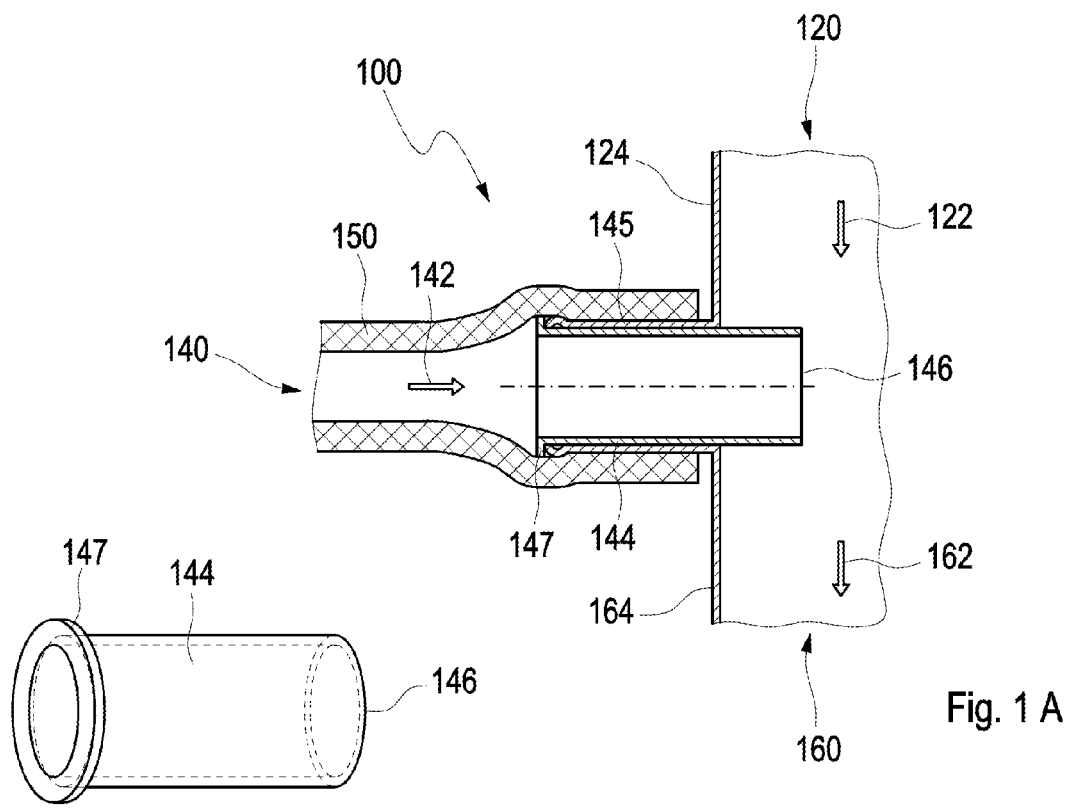
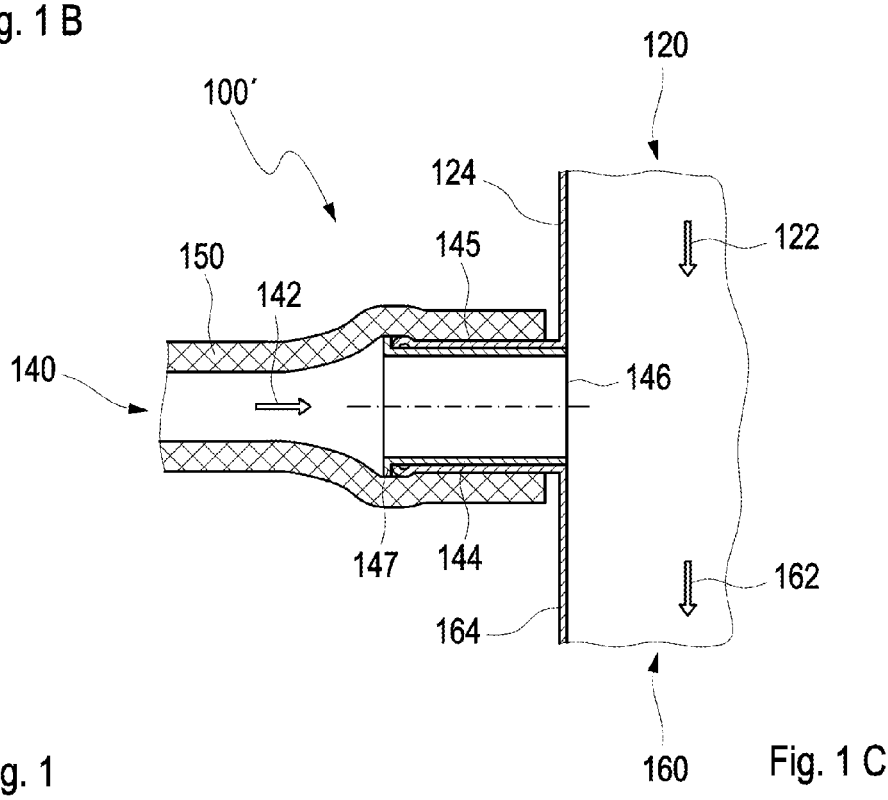
Fig. 1A
Fig. 1B
Fig. 1C
Fig. 1
PRIOR ART

CRANKCASE VENTILATION DEVICE FOR A MOTOR VEHICLE

CROSS-REFERENCE TO RELATED APPLICATION

This application claims priority to German Patent Application No. 10 2011 010 289.2, filed Feb. 3, 2011, which is incorporated herein by reference in its entirety.

TECHNICAL FIELD

The technical field relates to a crankcase ventilation device for an internal combustion engine of a motor vehicle. This comprises an intake air inlet, which is configured to have intake air flowing therethrough, and a crankcase gas inlet, which is configured to have crankcase gas flowing therethrough, and a charge air outlet, which is configured to have charge air flowing therethrough. At the same time, the crankcase ventilation device is configured to mix inlet crankcase gas with inlet intake air and to let it out as charge air.

BACKGROUND

Crankcase ventilation devices are used to extract from the crankcase gases (blow-by gases) that have entered into the crankcase of an internal combustion engine of a motor vehicle through leaks between the cylinder walls and the piston of the internal combustion engine without passing the gases into the environment as emission. Instead, these gases are mixed with the intake air and the mixture of these gases is supplied with the intake air to the internal combustion engine. When switching off the internal combustion engine, water can condense out, which can be deposited in the crankcase ventilation device and can be sucked in when re-starting the internal combustion engine.

The blow-by or crankcase gases contain water or moisture which can freeze to ice, when the internal combustion engine or the motor vehicle is operated in an environment with temperatures in the vicinity of or below the freezing point of water. Ice can form in the crankcase ventilation lines, possibly also in the intake air or charge airline leading to the injection device or to the turbocharger of the internal combustion engine. Ice formed in the crankcase gas inlet can then impede, restrict, or even bring to a stop the air flow in the crankcase gas inlet. As a result, an excess pressure can result in the crankcase. If ice particles become detached and are entrained with the intake air, this can lead to blockages in an injection device or even to damage in a turbocharger, possibly to air transport vanes of the turbocharger which are arranged in a fine mesh.

An approach to reduce ice formation is proposed in the document JP 8-246837 and is described hereinafter with reference to the appended FIG. 1A to FIG. 1C. In the ventilation devices 100 (see FIG. 1A) and 100' (see FIG. 1C), the crankcase gas flow direction 142 or a cylindrical crankcase gas inlet attachment 145 is provided perpendicular to the intake air flow direction 122 on a wall of an inlet connecting piece 124. A cylindrical charge air outlet connecting piece 164 is a continuation of the inlet connecting piece 124. As a particular feature, a crankcase gas inlet connecting piece 144 is provided as an insert (see FIG. 1B) in the crankcase gas inlet attachment 145. The inlet connecting piece 144 is made of a material which has a low thermal conductivity and from the surface of which ice is easily detached. Moisture contained in the crankcase gas therefore tends to be deposited in liquid form, possibly as water drops, on the inlet connecting piece 144.

At least one object is to provide a crankcase ventilation device that prevents water or ice from forming at places where crankcase gas and intake air are mixed together. In addition, other objects, desirable features, and characteristics will become apparent from the subsequent summary and detailed description, and the appended claims, taken in conjunction with the accompanying drawings and this background.

SUMMARY

The embodiments subsequently described can be combined with one another in a technologically meaningful manner. The description, in particular in connection with the drawings, additionally characterizes and specifies the embodiments.

Accordingly, a crankcase ventilation device is provided for an internal combustion engine of a motor vehicle. This comprises an intake air inlet, which is configured to have intake air flowing therethrough, and a crankcase gas inlet, which is configured to have crankcase gas flowing therethrough, and a charge air outlet, which is configured to have charge air flowing therethrough. At the same time, the crankcase ventilation device is configured to mix inlet crankcase gas with inlet intake air and to let it out as charge air, where the intake air inlet, the crankcase gas inlet, and the charge air outlet open into a widening. The crankcase gas inlet opens into the widening at a crankcase gas inlet opening. In this case, the distance of the crankcase gas inlet opening from a flow central axis running at least through the intake air inlet in one plane is greater than the distance of the intake manifold wall from the flow central axis.

Ambient air is taken into the intake air inlet, preferably through an air filter and possibly through measuring devices such as, for example, temperature sensors and mass sensors. The crankcase inlet is connected in a fluid-conducting manner to a crankcase interior. Crankcase gas and intake air leave the crankcase ventilation device as charge air that is either fed to a turbocharger or an injection device. The flow central axis can be a central axis of a cross-section extending in one direction, which is suitable for the passage of intake air. Intake air flows around this through the crankcase gas ventilation device. The intake air flow is restricted in the widening by the intake manifold wall. Upon entry of the intake air, the intake air forms an intake air jet. The plane in which the distance of the crankcase gas inlet opening from a flow central axis running through the intake air inlet is greater than the distance of the intake manifold wall from the flow central axis can be a plane spanned by a crankcase gas flow direction and an intake air flow direction. Crankcase gas flows through the crankcase gas inlet opening at a distance from the intake air jet into the widening.

As a result of such a configuration, it is achieved that the supplied crankcase gas, which tends to have high air moisture, is not mixed immediately with the intake air. Crankcase gas can be distributed in the widening and is then entrained by the intake air flow. This arrangement furthermore at least reduces and generally prevents a turbulent flow from forming in the widening, which on the one hand is unfavorable for flow and on the other hand promotes ice formation. A turbulent flow promotes ice formation for two reasons. Firstly, nuclei for condensing water can form at air particles which are not in transverse motion as can be the case in turbulence in a turbulent flow. Nuclei can however tend to form and grow when this is not in transverse motion, which is for example, swirled around in a turbulent crossflow vortex. Secondly, a nucleus for water formation has more time to grow if it is located in turbulence due to a turbulent flow. Since the crankcase gas inlet opening is disposed at a distance from the intake air jet, the intake air jet is on the one hand not deflected by the supplied crankcase gas flow, on the other hand the crankcase gas can collect around the intake air flow and be entrained by said flow. As a result, a continuous, less sudden heating of the crankcase gas takes place since the crankcase gas can be distributed around the intake air jet and a larger interface can form between inflowing crankcase gas and inflowing intake air.

According to an embodiment of the crankcase ventilation device, an upstream initial section of the charge air outlet opens in a disk-shaped downstream wall of the widening. Water that condenses when the internal combustion engine is switched off can be collected in the widening of the crankcase gas ventilation device. Upon restarting the internal combustion engine, collected water and ice are not sucked in but remain trapped in the widening on the disk-shaped wall.

According to another embodiment of the crankcase gas ventilation device, the intake air inlet and the charge air outlet are disposed coaxially to one another. In this way, the intake air jet can be guided with low losses into the charge air outlet.

According to another embodiment of the crankcase ventilation device, the inside diameter of the charge air outlet is greater than an inside diameter of the intake air inlet. It is thereby achieved that the intake air jet, which tends to widen and be mixed with crankcase gas, can be guided free from losses into the charge air outlet.

According to another embodiment of the crankcase gas ventilation device, the outer wall is cylindrically shaped and coaxial to the intake air inlet. In this embodiment, the supplied crankcase gas can collect around the intake air jet and be entrained by this jet.

According to another embodiment of the crankcase gas ventilation device, the intake air inlet has a downstream intake manifold end section, which projects into the widening. As a result, no stalling takes place in the area of the supply line of the intake air into the crankcase gas ventilation device due to a sudden widening so that a continuous, non-turbulent flow can be formed.

According to another embodiment of the crankcase ventilation device, a downstream intake manifold end section of the intake air inlet projects into a region that is located from the crankcase gas inlet in an imaginary downstream-directed extension of the crankcase gas inlet. In this way, the crankcase gas flow is retarded at least partially at the intake manifold end section so that its impingement upon the intake air jet deflects this less severely.

According to another embodiment of the crankcase ventilation device, the intake air inlet comprises an intake air inlet connecting piece, the crankcase gas inlet comprises a crankcase gas inlet connecting piece, and the charge air outlet comprises a charge air outlet connecting piece. A hose can be pulled over the intake air inlet connecting piece, the crankcase gas inlet connecting piece, and the charge air outlet connecting piece, for example, as a fluid-conducting connection. In this case, the intake air inlet connecting piece, the crankcase gas inlet connecting piece, and the charge air outlet connecting piece can be configured to be substantially cylindrical whereby a particularly easy handling and manufacture can be achieved. Other non-round cross-sections are also feasible for adaptation to the spatial circumstances in an environment of an internal combustion engine.

According to another embodiment, a Venturi element is placed on an upstream initial section of the charge air outlet connecting piece, that extends in a widening manner in an upstream direction in relation to the charge air flow direction from its attachment on the initial section in relation to its inside diameter and goes over continuously and in a rounded manner into the charge air outlet connecting piece. The Venturi element can expand from its attachment in the upstream direction more strongly than linearly in relation to the upstream direction. As a result, the intake air stream mixed with the crankcase gas can be guided continuously and with low losses into the charge air outlet. In addition, due to the Venturi element, a stronger suction and therefore a higher flow rate is produced for the gas flowing into the ventilation device, which ultimately results in a more efficient ventilation or diversion of gases from the crankcase.

According to another embodiment of the crankcase ventilation device, the intake air inlet comprises an intake air inlet connecting piece, the crankcase gas inlet comprises a crankcase gas inlet connecting piece, and the charge air outlet comprises a charge air outlet connecting piece. In this case, the crankcase gas inlet connecting piece, the intake air inlet connecting piece, and the charge air outlet connecting piece are configured such that a hose is pushed with its hose end section over an initial section of the connecting piece and can be connected in a gastight manner by means of a clip. This enables a connection of a hose line which is easy to execute. In this embodiment, the intake air inlet connecting piece, the crankcase gas inlet connecting piece, and the charge air outlet connecting piece can each be configured to be substantially cylindrical. This configuration enables an easy or a simple and cost-effective manufacture of all three connecting pieces.

According to another embodiment overall the crankcase ventilation device can be configured to be mirror-symmetrical in relation to a plane, which is spanned by the intake air flow direction and the crankcase gas flow direction. In this embodiment, the crankcase ventilation device can be manufactured by initially producing two parts that are mirror-symmetrical to the plane and then connecting the two parts to one another in the plane. The two parts can, for example, be interconnected by gluing, fusing, or welding. The mirror-symmetrical configuration overall enables a simple and cost-effective manufacture of the crankcase ventilation device. Alternatively to this embodiment, the charge air outlet and the widening can be configured in one part and/or the intake air inlet connecting piece and the widening can be configured in one part. Such one-piece assemblies are simple and cost-effective to manufacture and can easily be connected to the remaining parts of the crankcase ventilation device. According to this embodiment or independently thereof, the crankcase gas inlet connecting piece can be configured in its upstream initial section such that a crankcase ventilation hose can be pushed with its hose end section over the initial section and can be connected by means of clip in a gastight manner to the crankcase gas inlet connecting piece. This enables a connection of a crankcase ventilation hose line which is easy to execute.

According to an embodiment, an internal combustion engine is provided in which a crankcase ventilation device according to the previously described embodiments is built in or contained.

BRIEF DESCRIPTION OF THE DRAWINGS

The present invention will hereinafter be described in conjunction with the following drawing figures, wherein like numerals denote like elements, and:

FIG. 1 shows a crankcase ventilation device according to the prior art (i.e., as described I document JP 8-246837);

DETAILED DESCRIPTION

Figure 2:
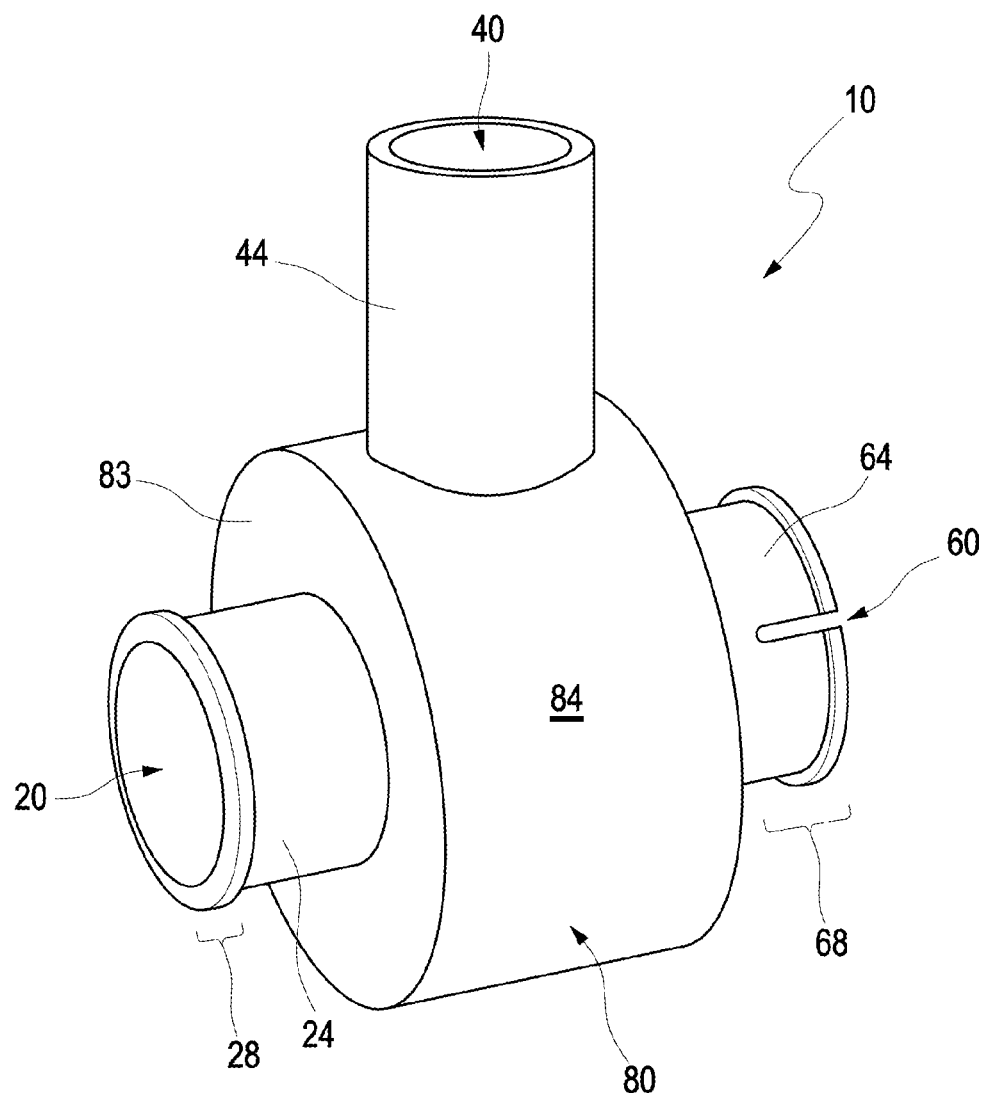
FIG. 2 shows a perspective view of a crankcase ventilation device.

The following detailed description is merely exemplary in nature and is not intended to limit application and uses. Furthermore, there is no intention to be bound by any theory presented in the preceding background or summary or the following detailed description.

The exemplary crankcase ventilation device 100 shown in FIG. 1 has already been explained initially. A crankcase ventilation device 10 is provided for an internal combustion engine 12 (see the schematic diagram in FIG. 5) of a motor vehicle and comprises an intake air inlet 20, which has an intake air inlet connecting piece 24 and is configured to have intake air flowing therethrough in an intake air flow direction 22; a crankcase gas inlet 40, which comprises a crankcase gas inlet connecting piece 44 and is configured to have crankcase gas flowing therethrough in a crankcase gas flow direction 42, and a charge air outlet 60, which comprises a charge air outlet connecting piece 64 and which is configured to have charge air flowing therethrough in a charge air flow direction 62. The charge air can be supplied to an injection device not shown or a turbocharger 70. Overall the crankcase ventilation device 10 is configured to mix crankcase gas taken-in in a motor vehicle with inlet intake air and to let it out as charge air, for example to an injection device or a turbocharger 70 (see FIG. 5).

Figure 3:
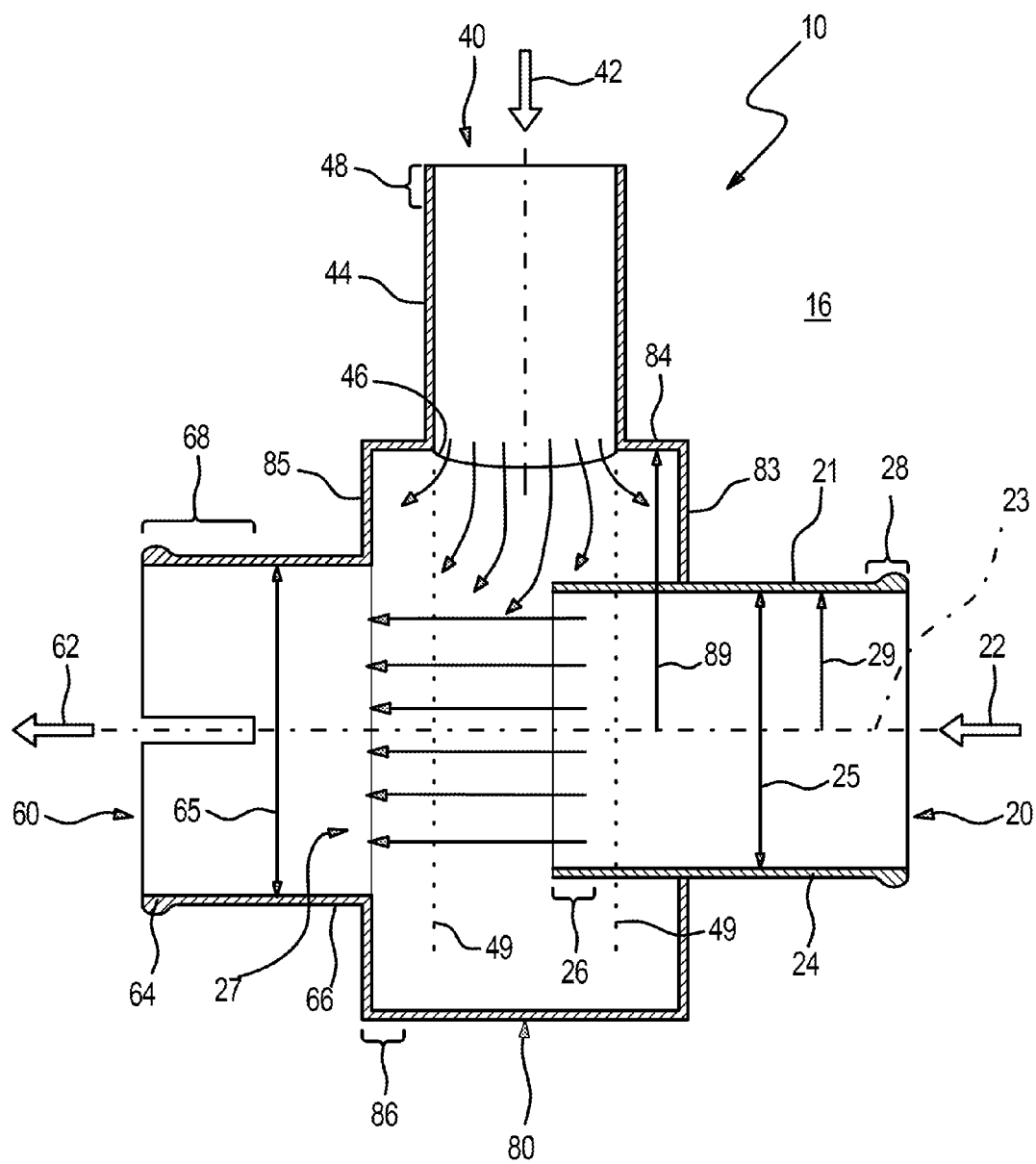
FIG. 3 shows a cross-section through the crankcase ventilation device according to an embodiment.
Figure 4:
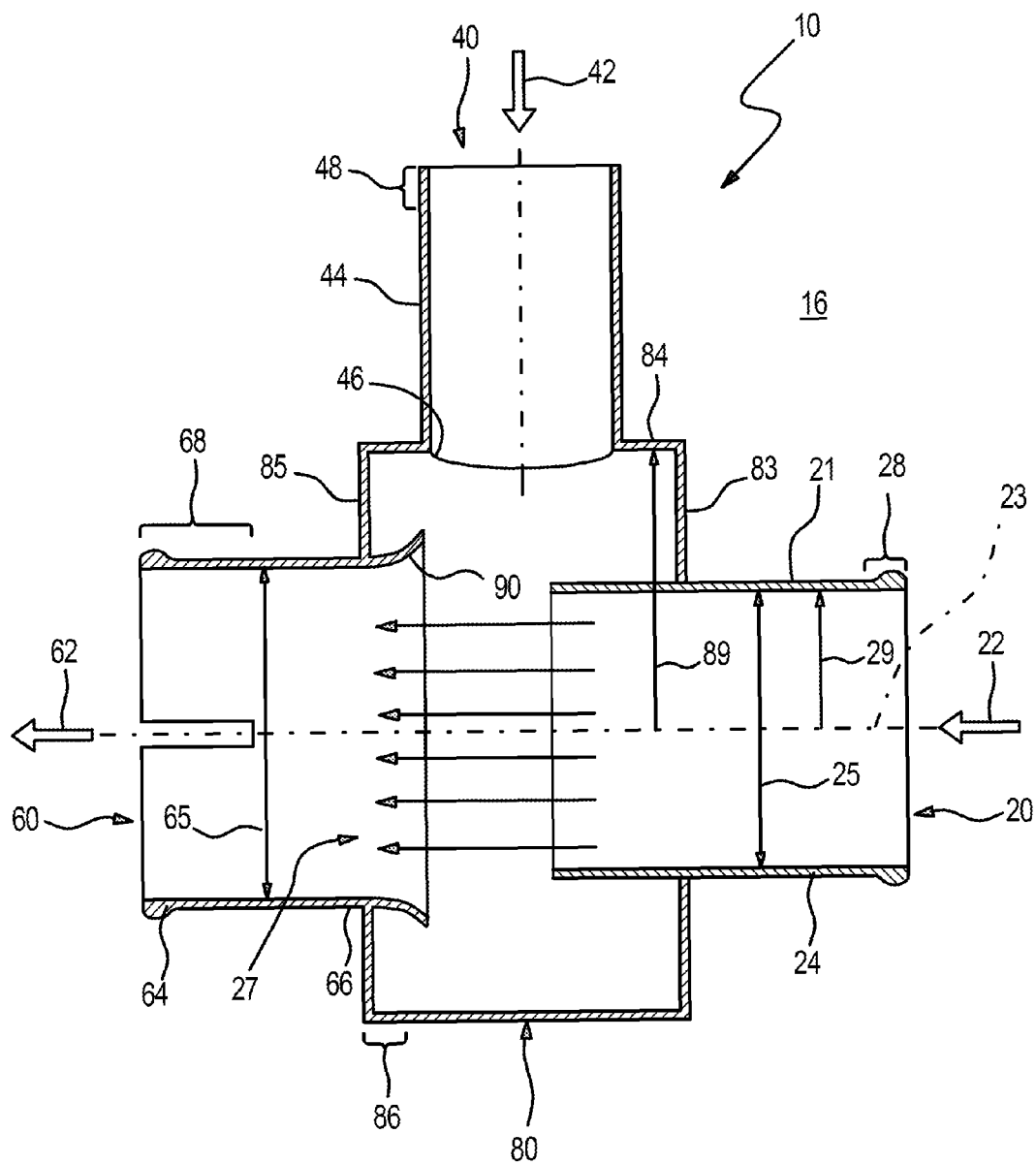
FIG. 4 shows a cross-section through the crankcase ventilation device according to another embodiment.

As shown schematically in FIG. 2, FIG. 3 and FIG. 4, an inside diameter 65 of the charge air outlet 60 is larger than an inside diameter 25 of the intake air inlet 20. Furthermore, a crankcase gas inlet opening 46 at which the crankcase gas inlet 40 opens into the crankcase gas ventilation device 10 is disposed at a distance from an intake air inlet 20 and an intake air jet 27 emerging therefrom, see FIG. 3 and FIG. 4. Also as shown, in some embodiments a first distance 89 of the crankcase gas inlet opening from flow central axis 23 is greater than a second distance 29 of the intake manifold wall (i.e., inner wall of structure 24) from the flow central axis 23.

Figure 5:
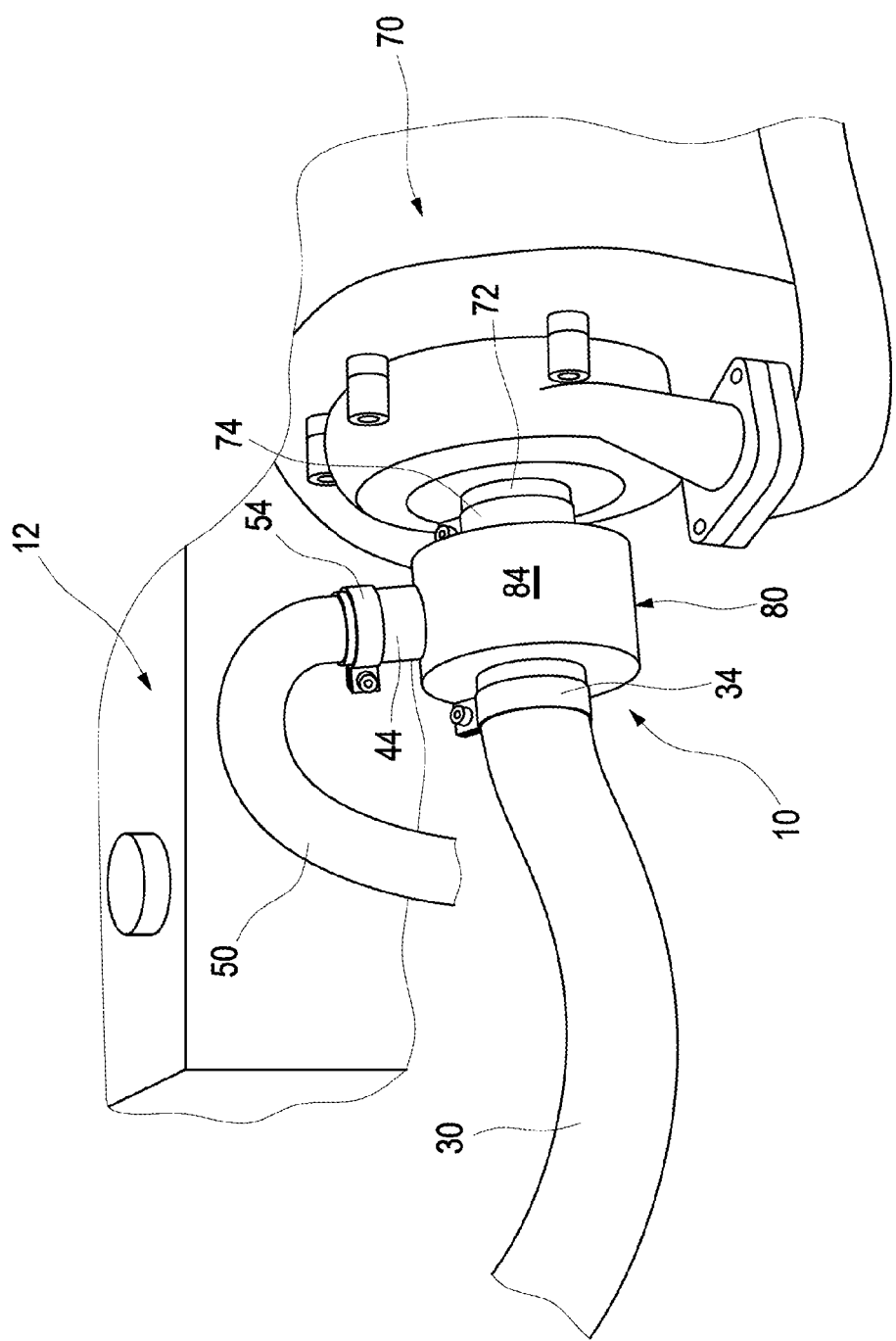
FIG. 5 shows a use of the crankcase ventilation device in an internal combustion engine of a motor vehicle.

With reference to FIG. 5, the arrangement of an intake air inlet connecting piece 24 enables an intake air hose 30 to be pushed with its hose end easily over an initial section 28 (see FIG. 3 and FIG. 4) and onto the inlet connecting piece 24 and to be connected by means of a clip 34 adapted in regard to its diameter to the outside diameter of the hose 30 for the intake air supply. For removal of the charge air, the charge air outlet connecting piece 64 can be pushed over a hose initial section of a charge air hose (not shown) and connected by means of a clip adapted in regard to its diameter to the outside diameter of the charge air outlet connecting piece 64 at the initial section of the hose.

The intake air inlet connecting piece 24 and the charge air outlet connecting piece 64 together form a part of the intake air line of an internal combustion engine of a motor vehicle. This part of the intake line in the same way as the inlet connecting piece 24 and the outlet connecting piece 64 exhibit a cylindrical symmetry corresponding to the symmetry of a hose or tube. A part of the intake line has a widening 80 that can be seen particularly clearly in FIG. 3 and FIG. 4. The widening 80 connects the inlet connecting piece 24 to the outlet connecting piece 64.

The widening 80 also exhibits a cylindrical symmetry and on its upstream side comprises a disk-shaped upstream wall 83 and on its downstream side comprises a likewise disk-shaped downstream wall 85, see FIG. 3 and FIG. 4. A downstream intake connecting piece end section 26 of the inlet connecting piece 24 projects through an opening of the upstream wall 83 and into the widening 80. The exhaust air outlet connecting piece 64 opens into the downstream wall 85 and to this end is connected with its outlet connecting piece initial section 66 with or along a diameter of an opening in the wall 85 to the wall 85 (see FIG. 3 and FIG. 4). Crankcase gas is let into the interior of the device 10 through the crankcase gas inlet 40 which comprises a crankcase gas inlet connecting piece 44. The crankcase gas inlet connecting piece 44 is configured in its initial section 48 and with regard to its outside diameter so that a crankcase ventilation hose 50 can be pushed with its hose end section 52 over the section 48 and onto the inlet connecting piece 44 and can be connected there to the inlet connecting piece 44 in a gastight manner by means of a clip 54 which is adapted with regard to its diameter to the outside diameter of the crankcase ventilation hose 50, as shown in FIG. 5.

The intake air inlet connecting piece 24, the charge air outlet connecting piece 64, and the crankcase gas inlet connecting piece 44 each exhibit a cylindrical symmetry and can thus be manufactured particularly easily and cost-effectively. The charge air outlet connecting piece 64 has two diametrically opposite incisions (as shown in FIG. 3 and FIG. 4) in its downstream charge air connecting section 68. Four such incisions disposed in the plane of the charge air outlet 60, each offset by 90 degrees in the direction of rotation can also be provided in the charge air connecting section 68 of the charge air outlet connecting piece 64. These incisions make it possible for the lips of the outlet connecting piece 64 formed between the incisions and extending along the circumference of the charge air connecting section 68 to be slightly compressed radially inward by a clip, such as the clip 72 shown in FIG. 5, and thus produce a non-positive connection with an initial section of a charge air hose introduced into the outlet connecting piece 64 or an inlet connecting piece 72, possibly of a turbocharger 70 (see FIG. 5) or an injection device (not shown).

In accordance with its cylindrically symmetric configuration, the crankcase gas inlet connecting piece 44 has an imaginary continuation 49 which extends downstream in the flow direction 42 of the incoming crankcase gas, which extends through or over a central region of the widening 80. An intake connecting piece end section 26 of the intake air inlet connecting piece 24 projects into this imaginary continuation 49 of the crankcase gas inlet connecting piece 44, as shown in FIG. 3.

FIG. 3 indicates an intake air jet 27 flowing through the widening. Incoming crankcase gases and incoming intake air become mixed and are let out from the device 10 as charge air through the charge air outlet connecting piece 64. Crankcase gas can have high air moisture. In addition, crankcase gas can be warmer than ambient air which enters into the crankcase ventilation device 10 as intake air. Warmer air can absorb more moisture than cold air. If warm and moist crankcase gas is mixed with cold intake air, the dew point can be fallen below and droplets can form, which can also freeze into ice. In the crankcase ventilation device 10, a region in which the supplied crankcase gas and intake air mix is enlarged substantially. Possible ice formation is thereby largely suppressed. A continuous, substantially laminar air flow is formed due to the coaxial arrangement of intake air inlet 20 and charge air outlet 60. Turbulences in the intake air jet 27 are largely avoided since the intake air jet 27 has sufficient space in the widening in order to escape outward so that turbulence can be reduced in a low-energy manner.

Turbulences slow the flow rate. However, the faster the air stream can flow, the lower is its pressure. As a result of this arrangement, a greater negative pressure is accordingly generated than in crankcase ventilation devices according to FIG. 1. In particular in internal combustion engines 12 with turbochargers 70, a negative pressure formed in the intake line is less great than in suction engines so that the crankcase can be better ventilated, the greater the negative pressure. It has been shown in experiments that a doubling of the generated negative pressure is possible with a crankcase ventilation device 10. This is a further advantageous effect which is established due to the spaced-apart arrangement of the crankcase gas inlet opening 46 from the intake air jet 27. This thereby prevents the crankcase gas inlet from freezing. In addition, due to the avoidance of turbulence, the nucleation of water droplets or ice crystals is suppressed at cold temperatures since the dwell time of possible nuclei in the intake air or charge air flow is reduced. Water drops formed nevertheless have no time to grow and therefore remain so small that they cannot damage a turbocharger 70. If larger water drops form nevertheless, they are attracted by the force of gravity and remain suspended in the widening 80 where they can vaporize.

In an embodiment of a crankcase ventilation device 10 shown in FIG. 4, a Venturi element 90 is additionally provided. The Venturi element 90 is placed on the upstream initial section 66 of the charge air outlet connecting piece 64 and extends in an upstream direction in relation to the charge air flow direction. It extends from its attachment, beginning with the inside diameter 65 of the outlet connecting piece 64 or the initial section 66, in a widening manner in the upstream direction in relation to its inside diameter 65. The Venturi element 90 is disposed in the intake air flow guided through the inlet 20 and is disposed coaxially to the intake air inlet 20 or the intake air inlet connecting piece 24.

In the embodiment shown in FIG. 4, the Venturi element 90 expands from its attachment in the initial section 66, or on a perimeter of an opening in the downstream wall 85 of the widening 80, in the upstream direction more substantially than linearly in relation to the upstream direction. Said element exhibits a cylindrical symmetry and expands from its attachment, on the initial section 66 or on the perimeter of the opening in the downstream wall 85 of the widening 80, into the widening 80.

The Venturi element has the effect that the ram pressure of the intake air is reduced since on the one hand it enables a continuous acceleration of charge air emerging from the widening 80 and on the other hand creates a softer transition for the charge air from the widening into the charge air outlet connecting piece 64. Since the Venturi element 90 is formed from a section which projects beyond the downstream wall 85, precipitating water drops can remain trapped in the region between the wall 85 and the outer region of the Venturi element 90 so that they do not enter into the charge air flow. Furthermore, an elevated negative pressure in the crankcase gas inlet 40 can be generated with a Venturi element 90. As a result, water droplets possibly formed in the crankcase gas inlet 40 are sucked away so that they cannot be deposited and freeze.

FIG. 5 shows a crankcase ventilation device 10 according to an embodiment in a built-in state in an internal combustion engine 12 of a motor vehicle. In this case, the device 10 is pushed with its inlet connecting piece 24 into the hose end of an intake air hose 30 and the hose 30 is fixed with a clip on the inlet connecting piece 24, which is not visible in FIG. 5. The outlet connecting piece 64 of the device 10 is pushed directly onto an inlet connecting piece 72 of a turbocharger 70 of an internal combustion engine 12 and is fixed there by means of a clip 74. Instead of on an inlet connecting piece 72 of a turbocharger, the outlet connecting piece 64 could also be connected on the inlet connecting piece of an injection device or a charge air hose. Crankcase gases removed from a crankcase, which is not marked in FIG. 5, of the internal combustion engine 12 via a crankcase ventilation hose 50 are fed to the crankcase gas inlet of the device 10. To this end, a hose end section of the ventilation hose 50 is connected by means of a clip 54 to the crankcase gas inlet connecting piece 44 of the device, as shown in FIG. 5. If the intake air is now so cold that the water freezes, the ice formed therefrom remains suspended and cannot pass into a downstream turbocharger or an injection device and cause damage. This is brought about by a downstream wall 85 at right angles to the charge air outlet 60 as also shown in FIG. 3. Ice formation such as described can be formed under cold weather conditions after switching off the internal combustion engine 12 due to the exhaust gases removed from the crankcase. That which can enter into the injection system or the turbocharger 70 at most are small snow-like and therefore soft ice particles which cannot damage the turbocharger 70. The reason why snow-like ice particles can form at most is seen in that the air stream in the crankcase ventilation device 10 suppresses a turbulent flow and supplied crankcase gas is added continuously in a cylindrical widening 80 surrounding the intake air jet 27 or the charge air stream.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A crankcase ventilation device for an internal combustion engine of a motor vehicle, comprising:
   an intake air inlet that is configured to have intake air flowing there through;
   a crankcase gas inlet that is configured to have crankcase gas flowing there through; and
   a charge air outlet that is configured to have charge air flowing there through;
   wherein the crankcase ventilation device is configured to mix inlet crankcase gas with inlet intake air and discharge charge air,
   wherein the intake air inlet, the crankcase gas inlet, and the charge air outlet open into a widening,
   wherein the crankcase gas inlet opens into the widening at a crankcase gas inlet opening, and
   wherein a first distance of the crankcase gas inlet opening from a flow central axis running at least through the intake air inlet at least in one plane is greater than a second distance of an intake manifold wall from the flow central axis and the widening is configured to provide substantially laminar air flow from the intake air inlet to the charge air outlet.

2. The crankcase ventilation device according to claim 1, wherein a first inside diameter of the charge air outlet is greater than a second inside diameter of the intake air inlet.

3. The crankcase ventilation device according to claim 1, further including an outer wall that is cylindrical and coaxial to the intake air inlet.

4. The crankcase ventilation device according to claim 1, wherein the intake air inlet has a downstream intake manifold end section that projects into the widening.

5. The crankcase ventilation device according to claim 1, wherein a downstream intake manifold end section of the intake air inlet is configured to project into a region that is located from the crankcase gas inlet in an imaginary downstream-directed extension of the crankcase gas inlet.

6. The crankcase ventilation device according to claim 1,
wherein the intake air inlet comprises an intake air inlet connecting piece,
wherein the crankcase gas inlet comprises a crankcase gas inlet connecting piece, and
wherein the charge air outlet comprises a charge air outlet connecting piece.

7. The crankcase ventilation device according to claim 6, wherein the intake air inlet connecting piece, the crankcase gas inlet connecting piece, and the charge air outlet connecting piece are each substantially cylindrical.

8. The crankcase ventilation device according to claim 7, wherein the intake air inlet connecting piece, the crankcase gas inlet connecting piece, and the charge air outlet connecting piece are configured to be mirror-symmetrical in relation to a plane that is spanned by an intake air flow direction and a crankcase gas flow direction.

9. The crankcase ventilation device according to claim 1, wherein the charge air outlet and the widening are configured in one part.

10. The crankcase ventilation device according to claim 1, wherein the intake air inlet and the widening are configured in one part.

11. A crankcase ventilation device for an internal combustion engine of a motor vehicle, comprising:
an intake air inlet that is configured to have intake air flowing there through;
a crankcase gas inlet that is configured to have crankcase gas flowing there through; and
a charge air outlet that is configured to have charge air flowing there through;
wherein the crankcase ventilation device is configured to mix inlet crankcase gas with inlet intake air and discharge charge air,
wherein the intake air inlet, the crankcase gas inlet, and the charge air outlet open into a widening,
wherein the crankcase gas inlet opens into the widening at a crankcase gas inlet opening,
wherein a first distance of the crankcase gas inlet opening from a flow central axis running at least through the intake air inlet at least in one plane is greater than a second distance of an intake manifold wall from the flow central axis, and wherein the intake air inlet and the charge air outlet are disposed coaxially to one another.

12. A crankcase ventilation device for an internal combustion engine of a motor vehicle, comprising:
an intake air inlet that is configured to have intake air flowing there through;
a crankcase gas inlet that is configured to have crankcase gas flowing there through; and
a charge air outlet that is configured to have charge air flowing there through;
wherein the crankcase ventilation device is configured to mix inlet crankcase gas with inlet intake air and discharge charge air,
wherein the intake air inlet, the crankcase gas inlet, and the charge air outlet open into a widening,
wherein the crankcase gas inlet opens into the widening at a crankcase gas inlet opening,
wherein a first distance of the crankcase gas inlet opening from a flow central axis running at least through the intake air inlet at least in one plane is greater than a second distance of an intake manifold wall from the flow central axis, and
wherein an upstream initial section of the charge air outlet opens in a disk-shaped downstream wall of the widening.

13. A crankcase ventilation device for an internal combustion engine of a motor vehicle, comprising:
an intake air inlet that is configured to have intake air flowing there through;
a crankcase gas inlet that is configured to have crankcase gas flowing there through; and
a charge air outlet that is configured to have charge air flowing there through;
wherein the crankcase ventilation device is configured to mix inlet crankcase gas with inlet intake air and discharge charge air,
wherein the intake air inlet, the crankcase gas inlet, and the charge air outlet open into a widening,
wherein the crankcase gas inlet opens into the widening at a crankcase gas inlet opening,
wherein a first distance of the crankcase gas inlet opening from a flow central axis running at least through the intake air inlet at least in one plane is greater than a second distance of an intake manifold wall from the flow central axis, and
a Venturi element that is placed on an upstream initial section of the charge air outlet and extends in a widening manner in an upstream direction in relation to a charge air flow direction from an attachment on an initial section in relation to an inside diameter and goes over continuously and in a rounded manner into the charge air outlet.

* * * * *